US010895852B2

(12) United States Patent
Uno

(10) Patent No.: US 10,895,852 B2
(45) Date of Patent: Jan. 19, 2021

(54) CONTROLLER AND MACHINE LEARNING DEVICE

(71) Applicant: Fanuc Corporation, Yamanashi (JP)

(72) Inventor: Kousuke Uno, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 155 days.

(21) Appl. No.: 16/225,775

(22) Filed: Dec. 19, 2018

(65) Prior Publication Data

US 2019/0196417 A1 Jun. 27, 2019

(30) Foreign Application Priority Data

Dec. 26, 2017 (JP) ................. 2017-250018

(51) Int. Cl.
G05B 11/42 (2006.01)
G06N 3/08 (2006.01)
(Continued)

(52) U.S. Cl.
CPC .......... *G05B 11/42* (2013.01); *G05B 13/0265* (2013.01); *G05B 19/4065* (2013.01); *G06N 3/006* (2013.01); *G06N 3/08* (2013.01); *G06N 20/00* (2019.01); *G05B 2219/33034* (2013.01); *G05B 2219/37252* (2013.01); *G05B 2219/42018* (2013.01)

(58) Field of Classification Search
CPC ........................................... G05B 2219/37252
USPC ......................................................... 700/28
See application file for complete search history.

(56) References Cited

U.S. PATENT DOCUMENTS

2015/0277399 A1* 10/2015 Maturana .............. G06F 9/5072
700/29

FOREIGN PATENT DOCUMENTS

GB 2289350 A 12/1993
JP H07-36506 A 2/1995
(Continued)

OTHER PUBLICATIONS

Bojja et al. "Experimental Comparison of Advance Control Strategies Which Uses Pattern Recognition Technique for Nonlinear System" 2010 Second International Conference on Machine Learning and Computing, IEEE Computer Society pp. 142-146 (Year: 2010).*

(Continued)

*Primary Examiner* — Emilio J Saavedra
(74) *Attorney, Agent, or Firm* — RatnerPrestia

(57) ABSTRACT

A machine learning includes a state observation unit that observes, as state variables representing a current state of an environment, PID control parameter data indicating the a parameter of the PID control during machining, machining condition data indicating a machining condition of the machining, and machining environment data relating to a machining environment of the machining, a determination data acquisition unit that acquires, as determination data, tool life determination data indicating an appropriateness determination result relating to depletion of the life of a tool during the machining, and cycle time determination data indicating an appropriateness determination result relating to the cycle time of the machining, and a learning unit that learns the machining condition and the machining environment of the machining, and the parameter of the PID control in association with each other.

6 Claims, 7 Drawing Sheets

(51) Int. Cl.
*G06N 3/00* (2006.01)
*G05B 13/02* (2006.01)
*G06N 20/00* (2019.01)
*G05B 19/4065* (2006.01)

(56) References Cited

FOREIGN PATENT DOCUMENTS

| | | |
|---|---|---|
| JP | 9-500331 A | 1/1997 |
| JP | 2007-049412 A1 | 5/2007 |

OTHER PUBLICATIONS

Huang et al., "The Application of Neural Networks in Selftuning Constant Force Control" International Journal of Machine Tools and Manufacture, vol. 36. No. 1. pp. 17-31, Jan. 1996, (Year: 1996).*
Cao et al., "The concept and progress of intelligent spindles: A review" International Journal of Machine Tools & Manufacture, vol. 112, Jan. 2017, pp. 21-52 (Year: 2017).*
Custompart.net, accessed at: "https://web.archive.org/web/20160307190630/https://www.custompartnet.com/wu/turning" Mar. 7, 2016, 8 pg. Printout (Year: 2016).*

* cited by examiner

TARGET SPINDLE LOAD  SPINDLE LOAD AT TIME t

SMART ADAPTIVE CONTROL

——— FEED RATE
------ SPINDLE LOAD

CONTROLLER AND MACHINE LEARNING DEVICE

CROSS-REFERENCE TO RELATED APPLICATION

This application is a new U.S. Patent Application that claims benefit of Japanese Patent Application No. 2017-250018 filed Dec. 26, 2017, the disclosure of this application is being incorporated herein by reference in its entirety for all purposes.

BACKGROUND OF THE INVENTION

1. Field of the Invention

The present invention relates to a controller and a machine learning device.

2. Description of the Related Art

A technique known as smart adaptive control, in which feed-rate override is controlled by PID control using a spindle load as an input value, is available as a conventional technique employed when performing machining using a machine tool (Japanese Translation of PCT Application No. H09-500331, for example). As shown in FIG. 8, when this technique is employed, the override is increased in a part where the load is low, thereby shortening the cycle time, and the override is reduced in a part where the load is high, thereby preventing tool damage and overheating. The output generated by the PID control can generally be calculated using formula 1. Note that in formula 1, the time at the start of the PID control is set at $t_0$.

$$O(t) = K_p e_L(t) + \int_{t_0}^{t} K_i e_L(t) dt + K_d \frac{d}{dt} e_L(t) + C \quad [\text{Math. 1}]$$

where O (t) denotes the output value, $e_L$ (t) denotes a difference between the target value of the control subject and the current value (at the time t), $K_p$ denotes the gain of the proportional term of the PID control, $K_i$ denotes the gain of the integral term of the PID control, $K_d$ denotes the gain of the derivative term of the PID control, and C denotes the offset of the PID control.

FIG. 7 shows an example of a block diagram of feedback control employing PID control according to a conventional technique. When the feed rate is controlled so that the load of the spindle becomes constant, the spindle load can be brought close to the target by setting the output value O (t) as the feed rate (the override), setting $e_L$ (t) as the difference between a target spindle load and the spindle load at the time t, and setting an appropriate value as a constant. When cutting is not underway, or in other words when the spindle spins idly, the spindle load does not vary even if the feed rate is increased, and therefore the control is preferably executed only during cutting, or in other words when the spindle load has reached at least a fixed value.

In the PID control, by adjusting parameters (the gains of $K_p$, $K_i$, and $K_d$ in formula 1 and FIG. 7, and so on) in accordance with the state of the control subject (in a machine tool, for example, the machine configuration, the type of tool, the material of the workpiece, the cutting depth, and so on), feedback control can be executed appropriately in accordance with the state of the control subject. PID control is a typical form of feedback control, and a large number of experiential gain setting methods, such as a limit sensitivity method, for example, have been devised. Further, Japanese Patent Application Publication No. H07-036506 and WO 2007/049412 disclose techniques employing neural networks to compensate for the PID control operation.

When an attempt is made to extend the life of the tool by maintaining the spindle load at the target load using smart adaptive control, the parameters of the PID control must be modified, and the effect of modification of the parameters on the life of the tool must be confirmed. However, the effect of parameter modification on the life of the tool can only be determined by actually using the tool to the end of its life. Meanwhile, to optimize the parameters of the PID control, an operation in which an experienced operator sets the parameters on the basis of experience, implements actual machining using the set parameters, and then adjusts the parameters in consideration of the results must be executed repeatedly, with the result that a heavy workload is placed on the operator. Due to a combination of these two problems, learning the relationship between the parameters of the PID control and the life of the tool takes a great deal of time.

SUMMARY OF THE INVENTION

Hence, an object of the present invention is to provide a controller and a machine learning device with which parameters of PID control can be determined so that the life of a tool can be extended without increasing a cycle time more than necessary.

In the present invention, the problems described above are solved by introducing a machine learning device into a controller for controlling a machine tool and then learning and determining parameters of PID control by machine learning so that the life of the tool can be extended without increasing the cycle time of the machining performed by the machine tool more than necessary.

An aspect of the present invention provides a numerical controller which, during controlling, on the basis of a machining program, a machine having a spindle including a tool and an axis that drives the spindle, executes PID control for controlling a movement rate of the axis so that a spindle load of the spindle becomes constant, the controller including a machine learning device that learns a parameter of the PID control in relation to a machining condition and a machining environment of the machining, wherein the machine learning device includes a state observation unit that observes, as state variables representing a current state of an environment, PID control parameter data indicating the parameter of the PID control during the machining, machining condition data indicating the machining condition of the machining, and machining environment data relating to the machining environment of the machining, a determination data acquisition unit that acquires, as determination data, tool life determination data indicating an appropriateness determination result relating to depletion of a life of the tool during the machining, and cycle time determination data indicating an appropriateness determination result relating to a cycle time of the machining, and a learning unit that uses the state variables and the determination data to learn the machining condition and the machining environment of the machining, and the parameter of the PID control in association with each other.

Another aspect of the present invention provides a numerical controller which, during controlling, on the basis of a machining program, a machine having a spindle including a tool and an axis that drives the spindle, executes PID control for controlling a movement rate of the axis so that a spindle load of the spindle becomes constant, the controller including a machine learning device that has learned a parameter of the PID control in relation to a machining condition and a machining environment of the machining, wherein the machine learning device includes a state observation unit that observes, as state variables representing a current state of an environment, PID control parameter data indicating the parameter of the PID control during the machining, machining condition data indicating the machining condition of the machining, and machining environment data relating to the machining environment of the machining, a learning unit that has learned the machining condition and the machining environment of the machining, and the parameter of the PID control in association with each other, and an estimation result output unit that outputs the parameter of the PID control on the basis of the state variables observed by the state observation unit and a learning result generated by the learning unit.

A further aspect of the present invention provides a machine learning device which, when PID control is executed during controlling, on the basis of a machining program, a machine having a spindle including a tool and an axis that drives the spindle, the PID control being executed to control a movement rate of the axis so that a spindle load of the spindle becomes constant, learns a parameter of the PID control in relation to machining condition and a machining environment of the machining, the machine learning device including a state observation unit that observes, as state variables representing a current state of an environment, PID control parameter data indicating the parameter of the PID control during the machining, machining condition data indicating the machining condition of the machining, and machining environment data relating to the machining environment of the machining, a determination data acquisition unit that acquires, as determination data, tool life determination data indicating an appropriateness determination result relating to depletion of a life of the tool during the machining, and cycle time determination data indicating an appropriateness determination result relating to a cycle time of the machining, and a learning unit that uses the state variables and the determination data to learn the machining condition and the machining environment of the machining, and the parameter of the PID control in association with each other.

A further aspect of the present invention provides a machine learning device which, when PID control is executed during controlling, on the basis of a machining program, a machine having a spindle including a tool and an axis that drives the spindle, the PID control being executed to control a movement rate of the axis so that a spindle load of the spindle becomes constant, has learned a parameter of the PID control in relation to machining condition and a machining environment of the machining, the machine learning device including a state observation unit that observes, as state variables representing a current state of an environment, PID control parameter data indicating the parameter of the PID control during the machining, machining condition data indicating the machining condition of the machining, and machining environment data relating to the machining environment of the machining, a learning unit that has learned the machining condition and the machining environment of the machining, and the parameter of the PID control in association with each other, and an estimation result output unit that outputs the parameter of the PID control on the basis of the state variables observed by the state observation unit and a learning result generated by the learning unit.

According to the present invention, the parameters of the PID control can be calculated by applying machine learning, thereby automating the difficult process of adjusting the PID control parameters, and accordingly, the parameters of the PID control can be set appropriately. As a result, the life of the tool can be lengthened while maintaining the cycle time to a certain extent.

BRIEF DESCRIPTION OF THE DRAWINGS

The above and other objects and characteristics of the present invention will become apparent from the following description of embodiments with reference to the attached figures, in which.

DETAILED DESCRIPTION OF THE PREFERRED EMBODIMENTS

Embodiments of the present invention will be described below alongside the figures.

Figure 1:
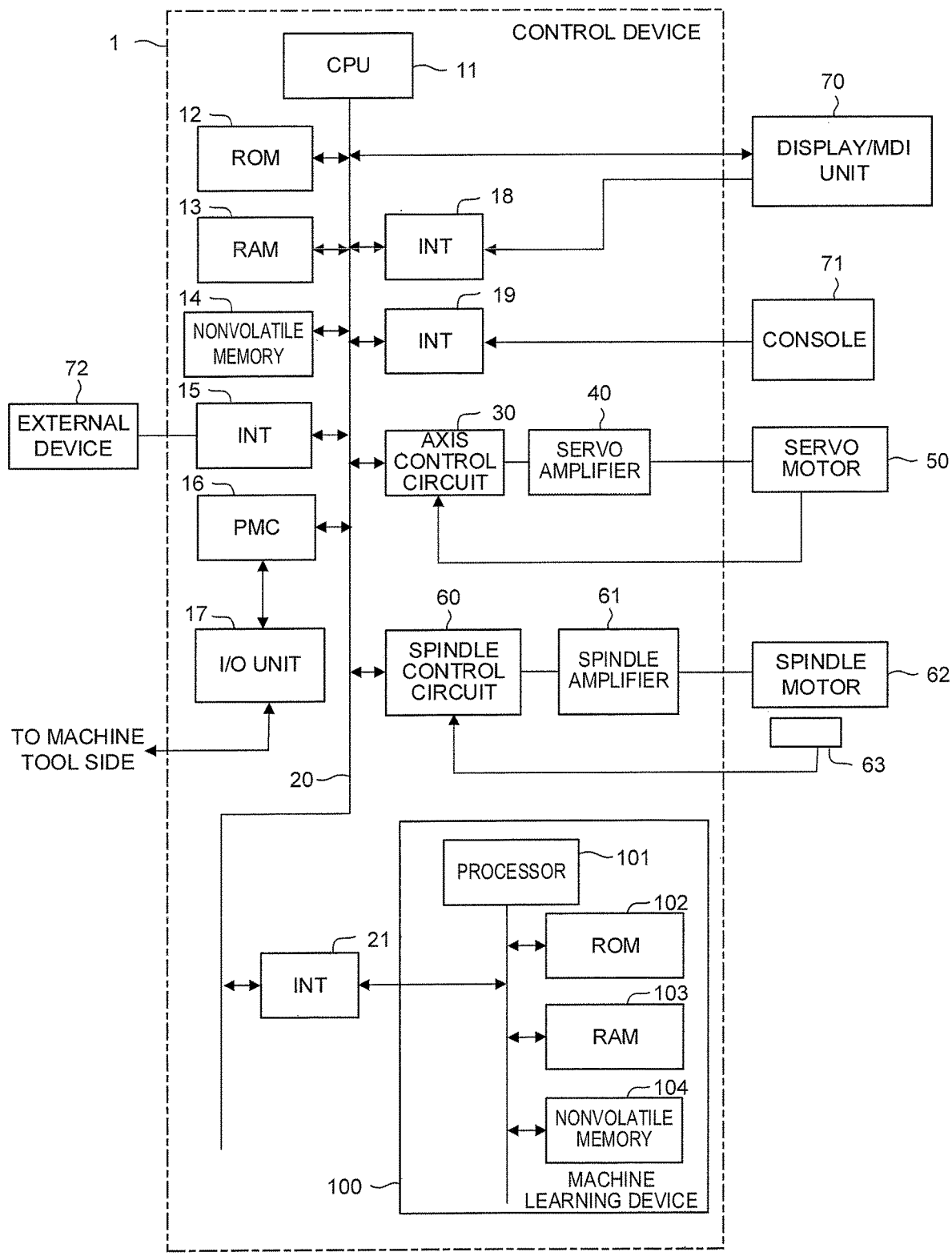
FIG. 1 is a schematic view showing a hardware configuration of a controller according to a first embodiment.

FIG. 1 is a schematic view showing a hardware configuration of main parts of a controller according to a first embodiment. A controller 1 can be embodied as a controller for controlling a machine tool, for example.

A CPU 11 provided in the controller 1 according to this embodiment is a processor for executing overall control of the controller 1. The CPU 11 reads a system program stored in a ROM 12 via a bus 20 and executes overall control of the controller 1 in accordance with the system program. A RAM 13 temporarily stores temporary calculation data, display data, various data input by an operator via an input unit, not shown in the figure, and so on.

A nonvolatile memory 14 is constituted by a memory that is backed up by a battery, not shown in the figure, or the like, for example, so that a storage state thereof is maintained even after a power supply of the controller 1 is switched OFF. The nonvolatile memory 14 stores a machining program read from an external device 72 via an interface 15, a machining program input via a display/MDI unit 70, and various data obtained from respective parts of the controller 1 and the machine tool (for example, machining conditions of the machine tool, information relating to a tool and a workpiece, positions of respective axes of the machine tool, and so on). The machining programs and various data stored in the nonvolatile memory 14 may be expanded to the RAM 13 when executed/used. Further, various system programs such as known analysis programs (including a system program for controlling communication with a machine learning device 100 to be described below) are written in advance to the ROM 12.

The interface 15 is used to connect the controller 1 to the external device 72, which is an adapter or the like. Programs, various parameters, and so on are read from the external device 72 side. Further, programs, various parameters, and so on that have been edited in the controller 1 can be stored in external storage means via the external device 72. A programmable machine controller (PMC) 16 executes control by outputting signals to the machine tool and a peripheral device (an actuator such as a robot hand used for tool replacement, for example) of the machine tool via an I/O unit 17 in accordance with a sequence program built into the controller 1. Further, the PMC 16 receives signals from various switches and the like on a console disposed on a main body of the machine tool, executes required signal processing, and then transmits the processed signals to the CPU 11.

The display/MDI unit 70 is a manual data input device including a display, a keyboard, and so on, and an interface 18 receives commands and data from the keyboard of the display/MDI unit 70 and transmits the received commands and data to the CPU 11. An interface 19 is connected to a console 71 that includes a manual pulse generator and so on used to drive the respective axes manually.

An axis control circuit 30 for controlling an axis of the machine tool receives an axis movement command amount from the CPU 11 and outputs an axis command to a servo amplifier 40. The servo amplifier 40, having received the command, drives a servo motor 50 for moving the axis of the machine tool. The servo motor 50 of the axis has an inbuilt position/speed detector and executes position/speed feedback control by feeding a position/speed feedback signal from the position/speed detector back to the axis control circuit 30.

Note that on the hardware configuration diagram of FIG. 1, the axis control circuit 30, the servo amplifier 40, and the servo motor 50 are each shown singly, but in actuality, these components are each provided in a number corresponding to the number of axes provided in the machine tool serving as the control subject.

A spindle control circuit 60 receives a spindle rotation command for a manufacturing machine, and outputs a spindle speed signal to a spindle amplifier 61. The spindle amplifier 61, having received the spindle speed signal, rotates a spindle motor 62 of the manufacturing machine at the commanded rotation speed in order to drive the tool. A position coder 63 is coupled to the spindle motor 62, and the position coder 63 outputs a feedback pulse in synchronization with the rotation of the spindle. The feedback pulse is read by the CPU 11.

An interface 21 is used to connect the controller 1 to the machine learning device 100. The machine learning device 100 includes a processor 101 for executing overall control of the machine learning device 100, a ROM 102 storing a system program and so on, a RAM 103 for performing temporary storage during various processing relating to machine learning, and a nonvolatile memory 104 used to store a learning model and so on. The machine learning device 100 is capable of observing information (for example, the machining program, the machining conditions of the machine tool, information relating to the tool and the workpiece, the positions of the respective axes of the machine tool, and so on) that can be acquired by the controller 1 via the interface 21. Further, the controller 1 controls the machine tool by receiving estimated values of PID control parameters, which are output by the machine learning device 100.

Figure 2:
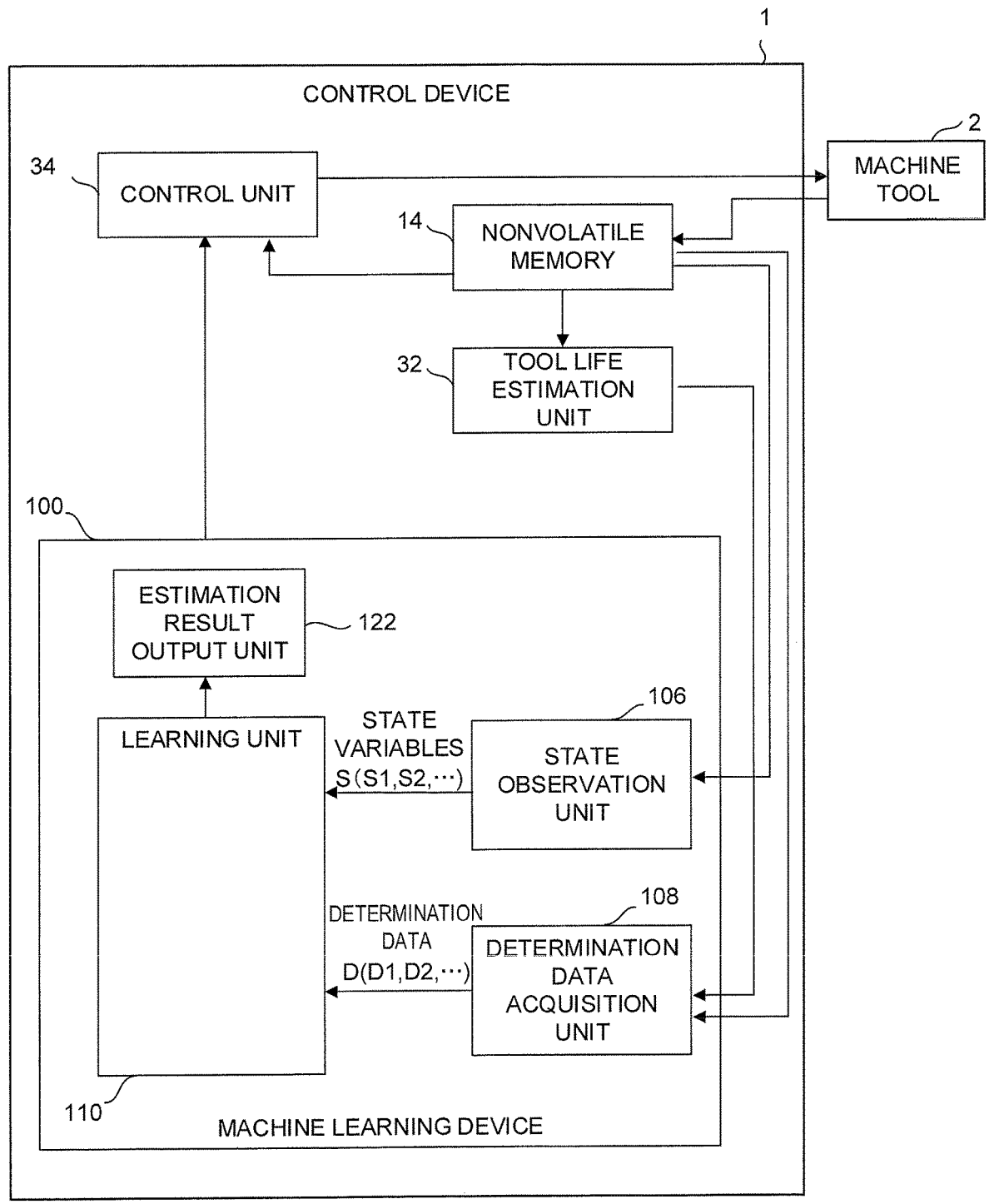
FIG. 2 is a schematic function block diagram of the controller according to the first embodiment.

FIG. 2 is a schematic function block diagram of the controller 1 and the machine learning device 100 according to the first embodiment. Respective function blocks shown in FIG. 2 are realized by having the CPU 11 of the controller 1 and the processor 101 of the machine learning device 100, as shown in FIG. 1, respectively execute system programs in order to control operations of the respective parts of the controller 1 and the machine learning device 100.

The controller 1 according to this embodiment includes a tool life estimation unit 32 for estimating the life of the tool on the basis of data acquired from a machine tool 2 (and stored in the nonvolatile memory 14), and a control unit 34 for controlling the machine tool 2 (the servo motor 50 and the spindle motor 62 provided therein) on the basis of the machining program stored in the nonvolatile memory 14 and the estimated values of the PID control parameters, output by the machine learning device 100.

The tool life estimation unit 32 serves as function means for estimating the life of the tool attached to the spindle on the basis of a spindle load and a feed rate acquired from the machine tool 2. Generally, when a workpiece is machined under identical machining conditions (tool, feed rate, spindle rotation speed, cutting depth, and so on), the load exerted on the spindle tends to increase steadily as the life of the tool shortens. Hence, experiments and the like are implemented in advance to determine the relationship between the spindle load and the life of the tool under each set of machining conditions, and the determined relationships are stored in the nonvolatile memory 14 in the form of a formula, a table, or the like. The tool life estimation unit 32 then estimates the life of the tool using the formula, table, or the like stored in the nonvolatile memory 14. Note that in this embodiment, the control unit 34 controls operations of the axes of the machine tool 2 by PID control, and therefore, in consideration of the fact that the spindle load becomes constant, the relationship between the feed rate and the tool life may be determined for each set of machining conditions and each target spindle load, the determined relationships may be stored in the nonvolatile memory 14 in the form of a formula, a table, or the like, and the tool life estimation unit 32 may estimate the life of the tool using the stored formula, table, or the like.

The control unit 34 serves as function means for controlling the respective axes of the machine tool 2 by PID control. The control unit 34 controls each axis of the machine tool 2 by PID control using parameters (gains $K_p$, $K_i$, $K_d$, an air-cut feed rate, upper and lower override limits, and so on) set on the basis of values that are either set in advance or output by the machine learning device 100.

Meanwhile, the machine learning device 100 provided in the controller 1 includes software (a learning algorithm and so on) and hardware (the processor 101 and so on) for self-learning, through so-called machine learning, estimates of appropriate PID control parameters in relation to the machining conditions and machining environment of the machining performed by the machine tool 2. What the machine learning device 100 provided in the controller 1 learns corresponds to a model structure expressing a correlation between the machining conditions and machining environment of the machining performed by the machine tool 2 and appropriate PID control parameters.

As illustrated by the function blocks in FIG. 2, the machine learning device 100 of the controller 1 includes a state observation unit 106 that observes, as state variables S representing the current state of an environment, parameter data S1 indicating the parameters of the PID control for controlling the machining performed by the machine tool 2, machining condition data S2 indicating the machining conditions of the machining performed by the machine tool 2, and machining environment data S3 indicating the machining environment of the machining performed by the machine tool 2, a determination data acquisition unit 108 that acquires determination data D including tool life determination data D1 indicating the life of the tool, which is depleted during machining performed by the machine tool 2 on the basis of the set PID control parameters, and cycle time determination data D2 indicating the cycle time, and a learning unit 110 that uses the state variables S and the determination data D to learn the machining conditions and machining environment of the machining performed by the machine tool 2 and appropriate PID control parameters in association with each other.

The PID control parameter data S1, among the state variables S observed by the state observation unit 106, can be acquired as the parameters of the PID control for controlling the machining performed by the machine tool 2. Examples of the parameters of the PID control for controlling the machining performed by the machine tool 2 include the gains $K_p$, $K_i$, $K_d$ of the PID control, the air-cut feed rate, the upper and lower override limit values, and so on.

PID control parameters determined by the machine learning device 100 on the basis of a learning result acquired by the learning unit 110 during a current learning period in relation to the machining conditions and machining environment of the machining performed by the machine tool 2 during the learning period immediately preceding the current period may be used as is as the PID control parameter data S1. When this method is employed, the machine learning device 100 may store the PID control parameters temporarily in the RAM 103 during each learning period, and the state observation unit 106 may acquire the PID control parameters of the immediately preceding learning period from the RAM 103 as the PID control parameter data S1 of the current learning period.

The machining condition data S2, among the state variables S observed by the state observation unit 106, can be acquired as machining conditions set in the controller l and machining conditions acquired from the machining program. Examples of the machining conditions set in the controller 1 and the machining conditions acquired from the machining program include the tool type, the cutting depth, the feed rate, the spindle rotation speed, and so on.

The machining environment data S3, among the state variables S observed by the state observation unit 106, can be acquired as a machining environment set in the controller 1 and a machining environment acquired from the machine tool 2, sensors, and so on. Examples of the machining environment set in the controller 1 and the machining environment acquired from the machine tool 2, sensors, and so on include the machine configuration of the machine tool 2, the material of the workpiece, the temperature and humidity of the environment, and so on.

The determination data acquisition unit 108 can use the life of the tool, which is depleted during machining performed by the machine tool 2 on the basis of the set PID control parameters, as the tool life determination data D1. The amount by which the life of the tool is depleted over one learning period, the tool life having been estimated by the tool life estimation unit 32 on the basis of machining-related data acquired when machining is actually performed on the basis of the set PID control parameters, may be calculated, the resulting value may be compared with a predetermined threshold, and a value indicating the favorability (how little the tool life has been depleted) and/or unfavorability (how much the tool life has been depleted) of the comparison result may be used as the tool life determination data D1 employed by the determination data acquisition unit 108. Alternatively, a value by which depletion of the life of the tool can be determined, such as the amount by which the life of the tool is depleted per unit cutting feed distance, the amount by which the life of the tool is depleted per unit cutting feed time, or the number of workpieces that can be machined by one tool when the tool is moved downward continuously under identical set PID control parameters, may be determined, and this value may be used as the tool life determination data D1.

Further, as the cycle time determination data D2, the determination data acquisition unit 108 can use a cycle time required when machining is performed by the machine tool 2 on the basis of the set PID control parameters. A value indicating the time spent on machining a single workpiece, which is estimated on the basis of the actual feed rate and so on of the machining that is performed by the machine tool 2 on the basis of the set PID control parameters, the number of workpieces that can be machined within a predetermined time, and so on may be used as the cycle time determination data D2 employed by the determination data acquisition unit 108.

Note that although the determination data acquisition unit 108 is an essential configuration at the stage of learning by the learning unit 110, once the learning unit 110 has finished learning the machining conditions and machining environment and the appropriate PID control parameters in association with each other, the determination data acquisition unit 108 is no longer an essential configuration. For example, when the machine learning device 100 is shipped to a customer after completing learning or the like, the determination data acquisition unit 108 may be removed prior to shipping.

The state variables S input simultaneously into the learning unit 110, when considered in terms of the learning period of the learning unit 110, are based on the data of the immediately preceding learning period in which the determination data D are obtained. Hence, as the machine learning device 100 of the controller 1 advances the learning process, acquisition of the machining condition data S2 and machining environment data S3, machining performed by the machine tool 2 while being controlled by PID control based on the PID control parameter data S1 estimated on the basis of the acquired data, and acquisition of the determination data D are implemented repeatedly in the environment.

The learning unit 110 learns the PID control parameters in relation to the machining conditions and machining environment of the machining performed by the machine tool 2 in accordance with a learning algorithm known generically as machine learning. The learning unit 110 can execute learning iteratively on the basis of a data set including the state variables S and the determination data D. As described above, during an iteration of a learning cycle for learning the PID control parameters in relation to the machining conditions and machining environment of the machining performed by the machine tool 2, the state variables S are acquired from the machining conditions and machining environment of the machining performed by the machine tool 2 in the immediately preceding learning period and the PID control parameters determined during the immediately preceding learning period, while the determination data D serve as appropriateness determination results indicating the appropriateness of the machining performed by the machine tool 2 while being controlled on the basis of the set PID control parameters.

By implementing this learning cycle repeatedly, the learning unit 110 can automatically recognize characteristics implying the correlation between the PID control parameters and the machining conditions and machining environment of the machining performed by the machine tool 2. At the start of the learning algorithm, the correlation between the PID control parameters and the machining conditions and machining environment of the machining performed by the machine tool 2 is substantially unknown, but the learning unit 110 gradually recognizes the characteristics and interprets the correlation while advancing the learning process. Once the correlation between the PID control parameters and the machining conditions and machining environment of the machining performed by the machine tool 2 has been interpreted to a standard having a certain degree of reliability, the learning result output iteratively by the learning unit 110 can be used to select (or in other words, decide) an action for setting the PID control parameters in relation to the current state (i.e. the machining conditions and machining environment of the machining performed by the machine tool 2). In other words, while advancing the learning algorithm, the learning unit 110 can gradually bring the correlation between the action for setting the PID control parameters and the machining conditions and machining environment of the machining performed by the machine tool 2 closer to an optimal solution.

An estimation result output unit 122 determines the PID control parameters on the basis of the result learned by the learning unit 110, and outputs the determined PID control parameters to the control unit 34. The estimation result output unit 122 outputs the PID control parameters when the machining conditions and machining environment of the machining performed by the machine tool 2 are input into the machine learning device 100 in a state where learning by the learning unit 110 is complete.

As described above, in the machine learning device 100 of the controller 1, the learning unit 110 learns the PID control parameters in relation to the machining conditions and machining environment of the machining performed by the machine tool 2 in accordance with a machine learning algorithm using the state variables S observed by the state observation unit 106 and the determination data D acquired by the determination data acquisition unit 108. The state variables S are constituted by data including the PID control parameter data S1, the machining condition data S2, and the machining environment data S3, while the determination data D are determined univocally by analyzing information acquired by the controller 1 from the machine tool 2. According to the machine learning device 100 provided in the controller 1, therefore, the PID control parameters can be set automatically and accurately in accordance with the machining conditions and machining environment of the machining performed by the machine tool 2 using the learning result acquired by the learning unit 110.

Since the PID control parameters can be set automatically, appropriate values for the PID control parameters can be determined quickly simply by ascertaining the machining conditions (the machining condition data S2) and the machining environment (the machining environment data S3) of the machining performed by the machine tool 2. As a result, the PID control parameters can be set efficiently.

In a modified example of the machine learning device 100 provided in the controller 1 according to this embodiment, the state observation unit 106 may further observe a target load indicating the target load of the spindle as the machining condition data S2. A value set in the controller 1 by the operator can be used as the target load.

According to this modified example, the machine learning device 100 can learn and determine the PID control parameters while taking into account the observed target load as the machining condition data S2, and as a result, appropriate PID control parameters can be determined in accordance with the set target load.

In another modified example of the machine learning device 100 provided in the controller 1 according to this embodiment, the target load may be used as a parameter of the PID control. In this case, the state observation unit 106 further observes the target load as the PID control parameter data S1, and machinable workpiece number determination data D3 indicating the number of workpieces that can be machined by one tool are used by the determination data acquisition unit 108 as the determination data D for determining the appropriateness of the machining performed by the machine tool 2.

According to this modified example, the machine learning device 100 uses the target load as a PID control parameter, and therefore an appropriate target load can be determined in addition to the other PID control parameters under the observed machining conditions and in the machining environment. By having an operator set a determination reference for the number of workpieces that can be machined by a single tool in the controller in advance, an appropriate target load for the tool can be set automatically within the range of the set determination reference, whereupon the machine tool 2 can be controlled accordingly.

In a further modified example of the machine learning device 100 provided in the controller 1 according to this embodiment, PID control stability data D4 indicating the stability of the PID control are used by the determination data acquisition unit 108 as the determination data D for determining the appropriateness of the machining performed by the machine tool 2. The determination data acquisition unit 108 can use the existence of vibration in the feed rate during the PID control, the time required to reach the target load, and so on as the PID control stability data D4.

According to this modified example, the machine learning device 100 can determine the stability of the PID control using the PID control stability data D4, and as a result, learning can be implemented such that PID control parameters with which the control operation becomes unstable are selected with minimal frequency.

Figure 3:
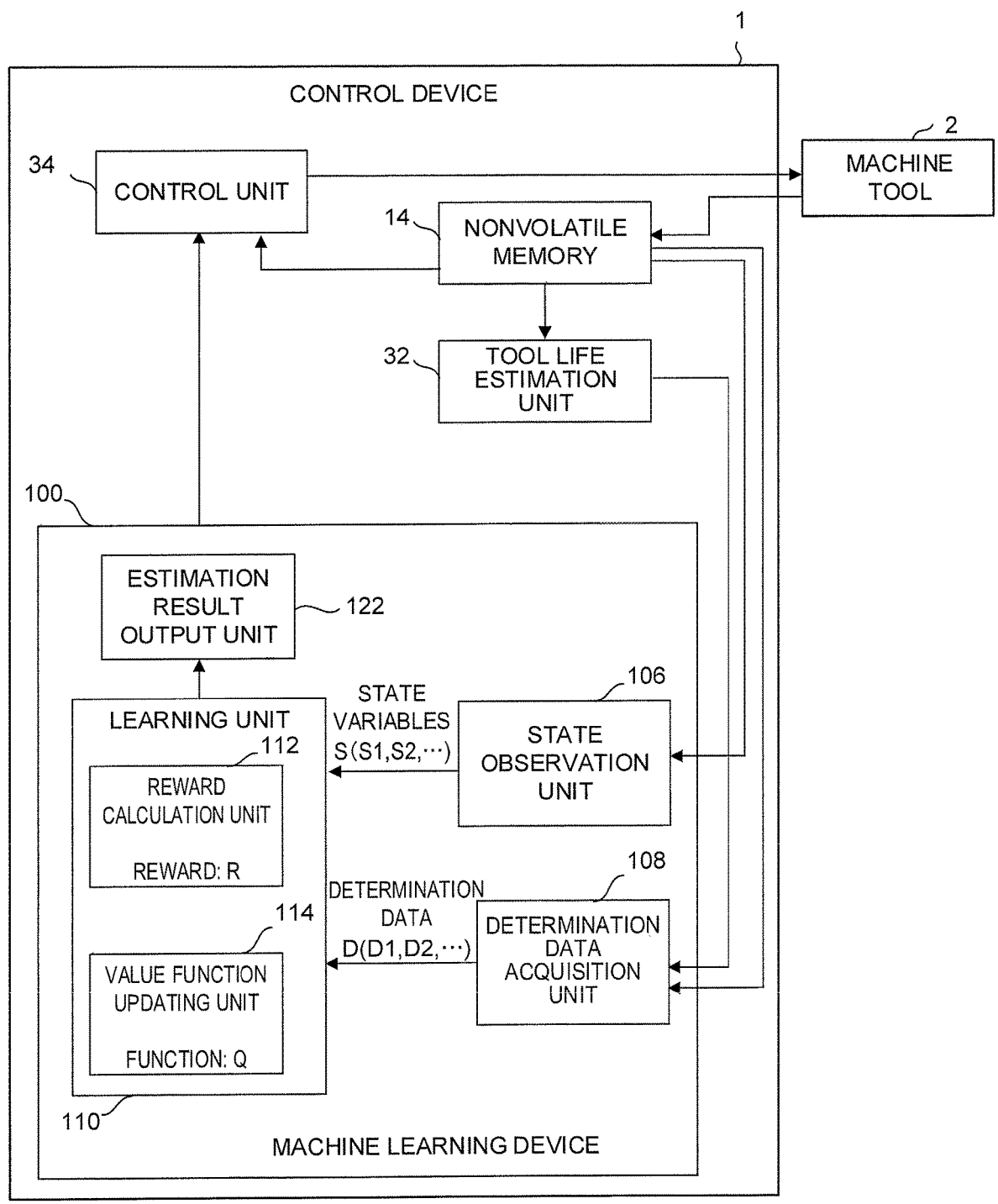
FIG. 3 is a schematic function block diagram showing an aspect of the controller.

In the machine learning device 100 configured as described above, there are no particular limitations on the learning algorithm executed by the learning unit 110, and a learning algorithm that is well-known in the field of machine learning may be employed. FIG. 3 shows an aspect of the controller 1 illustrated in FIG. 2, in which the learning unit 110 executes reinforcement learning as an example of the learning algorithm. Reinforcement learning is a method for iteratively performing, by trial and error, a cycle of observing the current state of the environment in which a learning subject exists (i.e. input), executing a predetermined action in the current state (i.e. output), and attaching a reward of some type to the action, whereupon a policy (in the machine learning device of the present application, the PID control parameters) for maximizing the sum of the reward is learned as the optimal solution.

In the machine learning device 100 of the controller 1 shown in FIG. 3, the learning unit 110 includes a reward calculation unit 112 for determining a reward R relating to the appropriateness determination result (corresponding to the determination data D used during the next learning period in which the state variables S are acquired) of the machining performed by the machine tool 2 when the PID control parameters are determined on the basis of the state variables S and the determined PID parameters are set, and a value function updating unit 114 that updates a function Q expressing a value of the PID control parameters using the reward R. The learning unit 110 learns the PID control parameters in relation to the machining conditions and machining environment of the machining performed by the machine tool 2 by having the value function updating unit 114 update the function Q repeatedly.

An example of a reinforcement learning algorithm executed by the learning unit 110 will now be described. The algorithm according to this example is known as Q-learning. In Q-learning, a state s of an agent and actions a that can be selected by the agent in the state s are used as independent variables in order to learn a function Q (s, a) representing the value of an action when the action a is selected in the state s. The optimal solution is acquired by selecting the action a at which the value function Q is maximized in the state s. Q-learning is started in a state where the correlation between the state s and the action a is unknown, and by a repeated process of trial and error in which various actions a are selected in a given state s, the value function Q is updated iteratively so as to approach the optimal solution. In this case, when the environment (in other words, the state s) varies as a result of selecting the action a in the state s, a reward (in other words, a weighting applied to the action a) r corresponding to the variation is acquired, and by guiding the learning process so as to select an action a with which a higher reward r is acquired, the value function Q can be brought close to the optimal solution comparatively quickly.

A typical formula for updating the value function Q can be expressed as shown below in formula 2. In formula 2, $s_t$ and $a_t$ respectively denote a state and an action at a time t. As a result of the action $a_t$, the state varies to $s_{t+1}$. $r_{t+1}$ denotes the reward acquired when the state varies from $s_t$ to $s_{t+1}$. The term maxQ denotes Q when the action a that results in the maximum value Q (as assumed at the time t) is taken at a time t+1. $\alpha$ and $\gamma$ respectively denote a learning coefficient and a discount factor, these values being set as desired within $0<\alpha\le1$ and $0<\gamma\le1$.

$$Q(s_t, a_t) \leftarrow Q(s_t, a_t) + \alpha\left(r_{t+1} + \gamma \max_a Q(s_{t+1}, a) - Q(s_t, a_t)\right) \quad \text{[Math. 2]}$$

When the learning unit 110 executes Q-learning, the state variables S observed by the state observation unit 106 and the determination data D acquired by the determination data acquisition unit 108 correspond to the state s of the update formula, the action for determining how to set the PID control parameters in relation to the current state (i.e. the machining conditions and machining environment of the machining performed by the machine tool 2) corresponds to the action a of the update formula, and the reward R determined by the reward calculation unit 112 corresponds to the reward r of the update formula. Hence, the value function updating unit 114 repeatedly updates the function Q expressing the value of the PID control parameters relative to the current state by means of Q-learning using the reward R.

For example, the reward R determined by the reward calculation unit 112 can be set at a positive (plus) reward R when, after the PID control parameters are determined, the appropriateness determination result of the machining performed by the machine tool 2 on the basis of the set PID control parameters is "appropriate" (for example, when the amount by which the life of the tool is depleted is smaller than a predetermined threshold, the cycle time of the machining is shortened, or the like), and can be set at a negative (minus) reward R when, after the PID control parameters are determined, the appropriateness determination result of the machining performed by the machine tool 2 on the basis of the set PID control parameters is "inappropriate" (for example, when the amount by which the life of the tool is depleted exceeds the predetermined threshold, the cycle time of the machining is lengthened, or the like). Absolute values of the positive and negative rewards R may be identical or different. Further, the plurality of values included in the determination data D may be combined for use as a determination condition.

Furthermore, the appropriateness determination result of the machining performed by the machine tool 2 on the basis of the set PID control parameters does not have to be limited to the two results "appropriate" and "inappropriate", and may be set in a plurality of stages. For example, in a case where a depletion amount threshold $L_{max}$ is used as an index of the life of the tool used in the machining performed by the machine tool 2, a reward of R=5 can be issued when the depletion L in the life of the tool during the machining performed by the machine tool 2 is $0\le L<L_{max}/5$, a reward of R=3 can be issued when $L_{max}/5\le L<L_{max}/2$, a reward of R=2 can be issued when $L_{max}/2\le L<L_{max}$, and a reward of R=1 can be issued when $L_{max}\le L$. The manner in which the reward is issued may also be adjusted as appropriate in accordance with the aim of the learning, for example by issuing a large negative reward when the feed rate of the axis vibrates or the target load is not reached as a result of the PID control, or the like. Moreover, the threshold used in the determination may be set to be comparatively large at the initial stage of learning and then reduced as learning advances.

The value function updating unit 114 is capable of holding an action value table on which the state variables S, the determination data D, and the rewards R are arranged in association with the action value (a numerical value, for example) expressed by the function Q. In this case, a behavior of the value function updating unit 114 for updating the function Q is synonymous with a behavior of the value function updating unit 114 for updating the action value table. At the start of Q-learning, the correlation between the current state of the environment and the PID control parameters is unknown, and therefore, on the action value table, the various state variables S, determination data D, and rewards R are prepared in association with a value of a randomly determined action value (function Q). Note that when the reward calculation unit 112 knows the determination data D, the reward calculation unit 112 can calculate the reward R corresponding thereto immediately and write the calculated value R to the action value table.

As Q-learning advances using the reward R corresponding to the appropriateness determination result of the machining performed by the machine tool 2, the learning is guided in a direction for selecting actions with which higher rewards R are acquired, and in accordance with the state of the environment (in other words, the state variables S and the determination data D), which varies as a result of executing the selected action in the current state, the action value table is updated by rewriting the value of the action value (the function Q) relating to the action performed in the current state. By updating the action value table repeatedly, the value of the action value (the function Q) displayed on the action value table is rewritten to a steadily higher value as the action becomes more appropriate (in the case of the present invention, an action for suppressing depletion of the life of the tool within a range where the cycle time of the machining performed by the machine tool 2 does not greatly increase). Thus, the previously unknown correlation between the current state of the environment (the machining conditions and machining environment of the machining performed by the machine tool 2) and the action (determination of the PID control parameters) taken in response thereto gradually becomes clearer. In other words, by updating the action value table, the relationship between the PID control parameters and the machining conditions and machining environment of the machining performed by the machine tool 2 gradually approaches the optimal solution.

Figure 4:
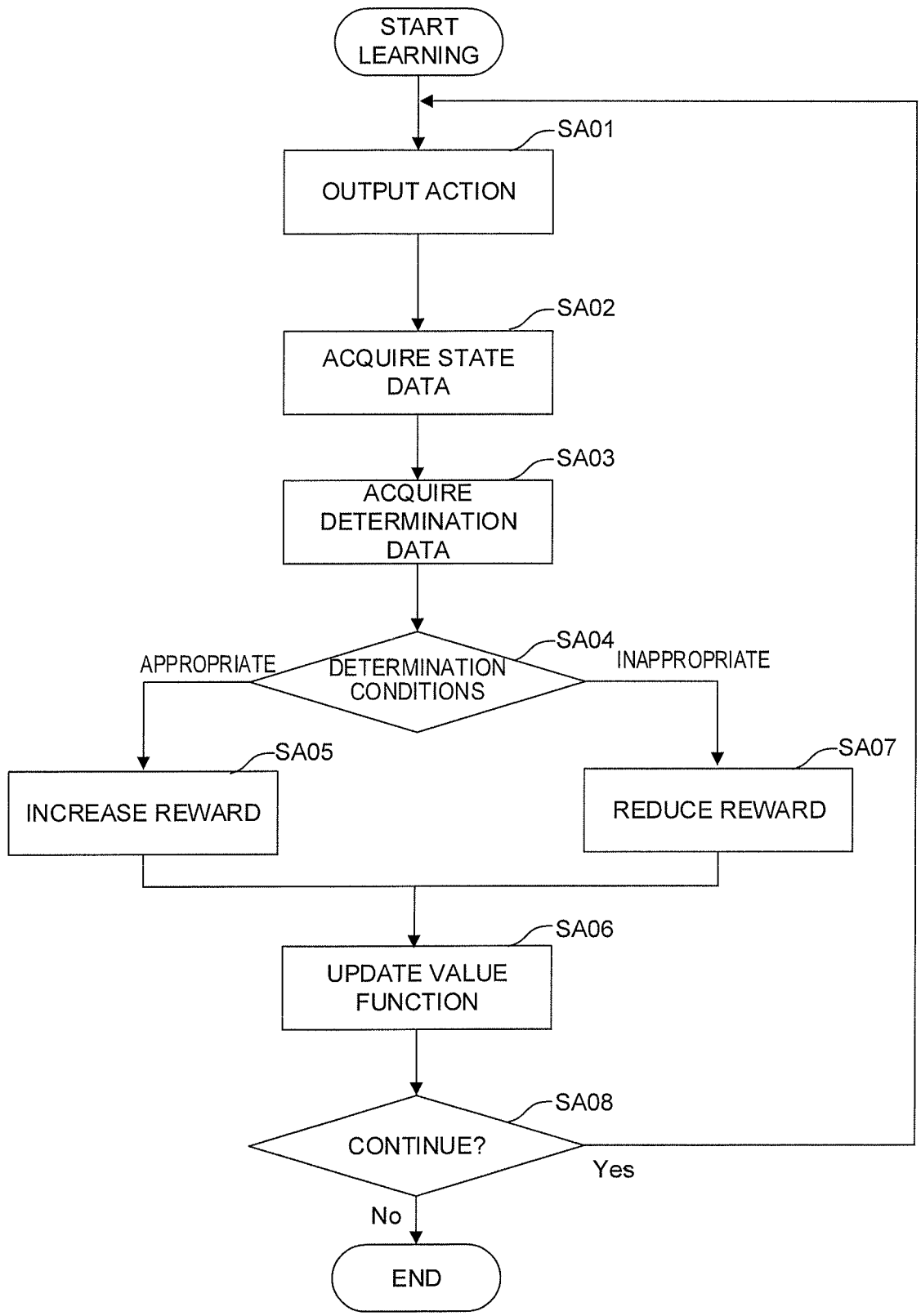
FIG. 4 is a schematic flowchart showing an aspect of a machine learning method.

Referring to FIG. 4, the flow of the Q-learning executed by the learning unit 110 (in other words, an aspect of a machine learning method) will be further described. First, in step SA01, the value function updating unit 114 selects random PID control parameters as the action to be taken in the current state, the current state being indicated by the state variables S observed by the state observation unit 106, while referring to the action value table at the current point in time. Next, the value function updating unit 114 takes in the state variables S of the current state, observed by the state observation unit 106, in step SA02 and takes in the determination data D of the current state, acquired by the determination data acquisition unit 108, in step SA03. Next, in step SA04, the value function updating unit 114 determines whether or not the PID control parameters are appropriate on the basis of the determination data D, and when the parameters are appropriate, applies the positive reward R determined by the reward calculation unit 112 to the update formula of the function Q in step SA05. Next, in step SA06, the value function updating unit 114 updates the action value table using the state variables S and determination data D of the current state, the reward R, and the value of the action value (the updated function Q). When the PID control parameters are determined to be inappropriate in step SA04, the value function updating unit 114 applies the negative reward R determined by the reward calculation unit 112 to the update formula of the function Q in step SA07 and then updates the action value table using the state variables S and determination data D of the current state, the reward R, and the value of the action value (the updated function Q) in step SA06. The learning unit 110 updates the action value table iteratively by repeating steps SA01 to SA07, and in so doing advances learning of the PID control parameters. Note that the processing for determining the reward R and the processing for updating the value function in steps SA04 to SA07 are executed on the respective data included in the determination data D.

Figure 5A:
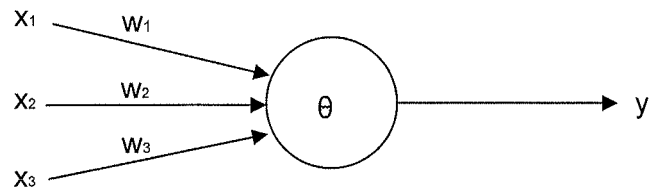
FIG. 5A is a view illustrating a neuron.
Figure 5B:
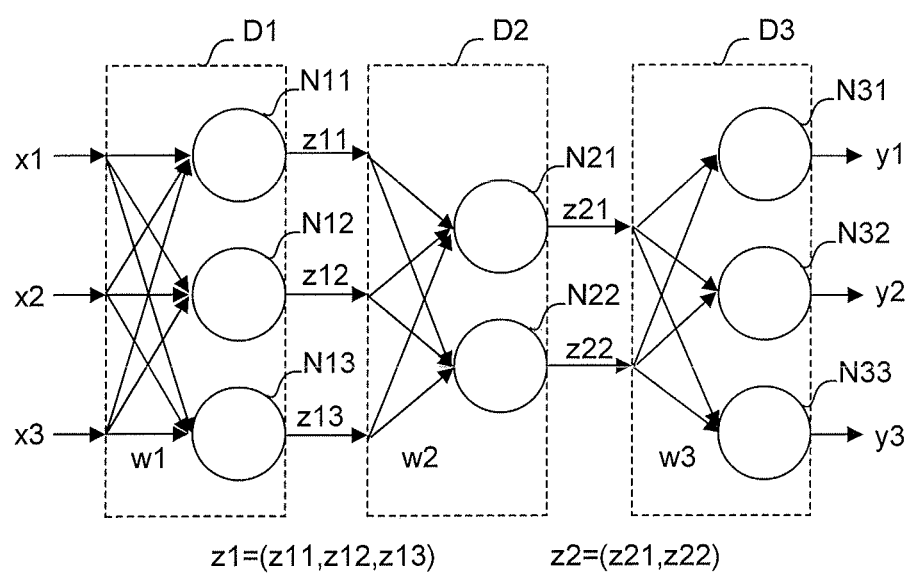
FIG. 5B is a view illustrating a neural network.

To advance the reinforcement learning process described above, a neural network, for example, can be applied. FIG. 5A is a pattern diagram showing a model of a neuron, and FIG. 5B is a pattern diagram showing a model of a three-layer neural network formed by combining the neuron shown in FIG. 5A. A neural network can be constructed using calculation devices, storage devices, or the like imitating a model of a neuron, for example.

The neuron shown in FIG. 5A outputs a result y in response to a plurality of inputs x (here, for example, an input $x_1$ to an input $x_3$). A weighting w ($w_1$ to $w_3$) corresponding to the input x is applied to each of the inputs $x_1$ to $x_3$. As a result, the neuron outputs the output y in the form shown below in formula 3. Note that in formula 3, the input x, the output y, and the weighting w are all vectors. Further, θ denotes a bias and $f_k$ denotes an activation function.

$$y = f_k(\Sigma_{i=1}^{n} x_i w_i - \theta) \quad \text{[Math. 3]}$$

In the three-layer neural network shown in FIG. 5B, a plurality of inputs x (here, for example, an input x1 to an input x3) are input from the left side and results y (here, for example, a result y1 to a result y3) are output from the right side. In the example in the figure, corresponding weightings (expressed collectively as w1) are multiplied respectively by the inputs x1, x2, x3 so that the individual inputs x1, x2, x3 are all input into three neurons N11, N12, N13.

In FIG. 5B, the respective outputs of the neurons N11 to N13 are expressed collectively as z1. The outputs z1 can each be seen as a feature vector acquired by extracting a feature amount of the relevant input vector. In the example in the figure, corresponding weightings (expressed collectively as w2) are multiplied respectively by the feature vectors z1 so that the individual feature vectors z1 are all input into two neurons N21, N22. The feature vectors z1 express features between the weighting W1 and the weighting W2.

In FIG. 5B, the respective outputs of the neurons N21 and N22 are expressed collectively as z2. The outputs z2 can each be seen as a feature vector acquired by extracting a feature amount of the relevant feature vector z1. In the example in the figure, corresponding weightings (expressed collectively as w3) are multiplied respectively by the feature vectors z2 so that the individual feature vectors z2 are all input into three neurons N31, N32, N33. The feature vectors z2 express features between the weighting W2 and the weighting W3. Finally, the neurons N31 to N33 respectively output the results y1 to y3.

Note that a so-called deep learning method employing a neural network formed from more than three layers may also be used.

In the machine learning device 100 of the controller 1, by using a neural network as the value function of Q-learning and having the learning unit 110 calculate a multilayer structure corresponding to the neural network described above using the state variables S and the action a as the input x, the value of the action in the relevant state (i.e. the result y) can be output. Note that the neural network includes a learning mode and a value prediction mode as operating modes. For example, in the learning mode, the weighting w is learned using a learning data set, and in the value prediction mode, the value of an action can be determined using the learned weighting w. Further, in the value prediction mode, detection, classification, reasoning, and so on can also be performed.

The configuration of the controller 1 described above may also be described as a machine learning method (or software) executed by the processor 101. This machine learning method is a method for learning the PID control parameters, in which a CPU of a computer performs a step for observing the PID control parameter data S1, the machining condition data S2, and the machining environment data S3 as the state variables S representing the current state of the environment in which the machine tool 2 performs machining, a step for acquiring the determination data D indicating the appropriateness determination result of the machining performed by the machine tool 2 on the basis of the determined PID control parameters, and a step for using the state variables S and the determination data D to learn the machining condition data S2 and machining environment data S3 and the PID control parameters in association with each other.

Figure 6:
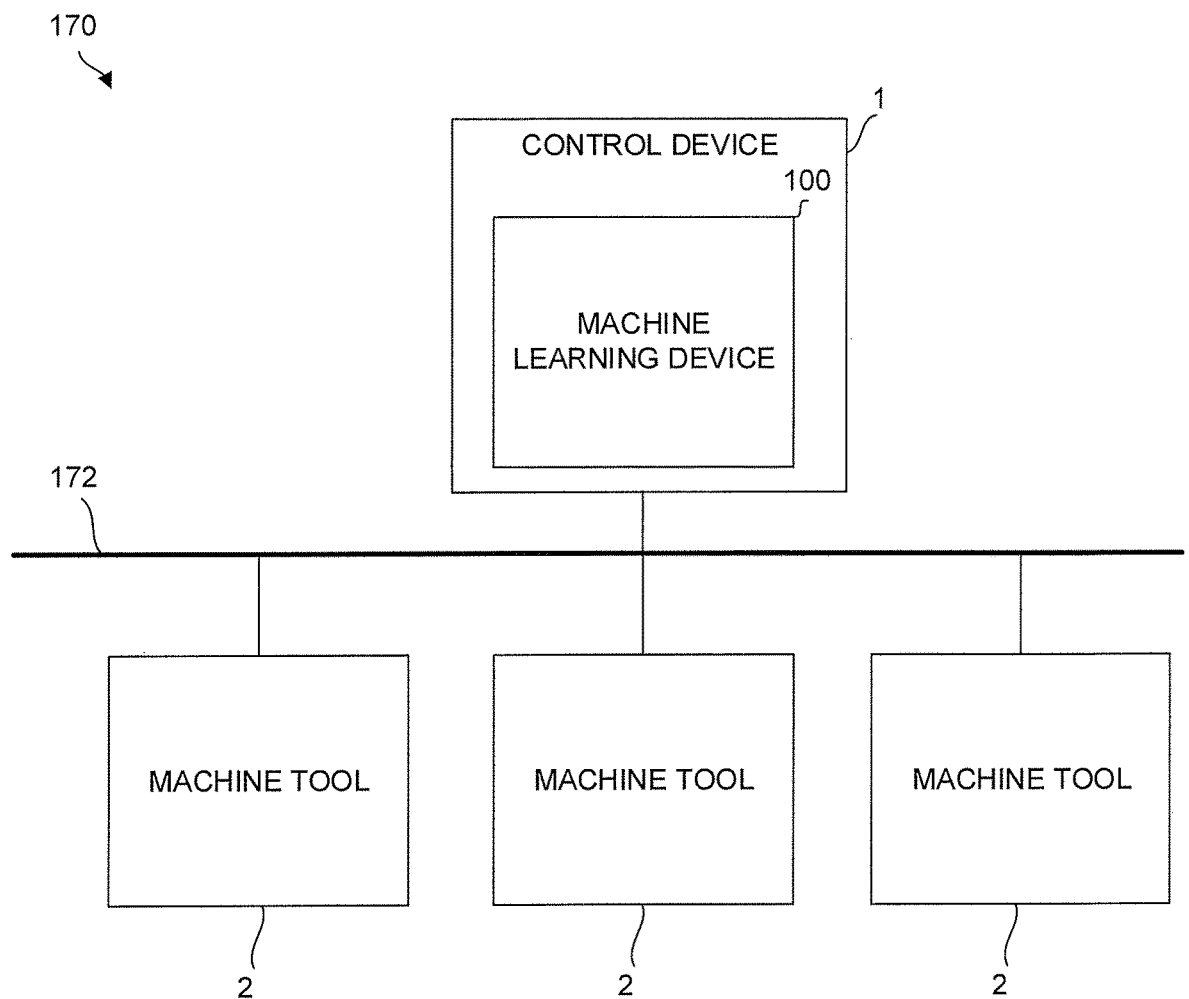
FIG. 6 is a schematic function block diagram showing an aspect of a system incorporating the controller.
Figure 7:
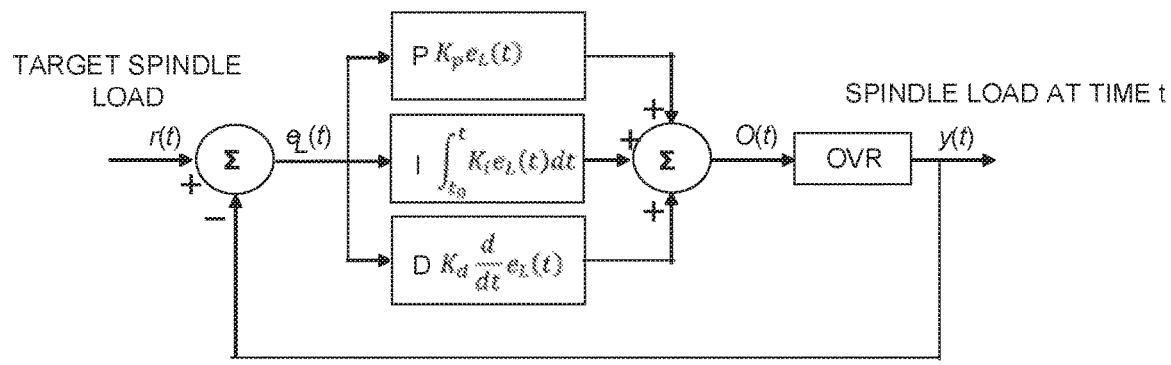
FIG. 7 is an example of a block diagram of feedback control employing PID control according to a conventional technique.
Figure 8:
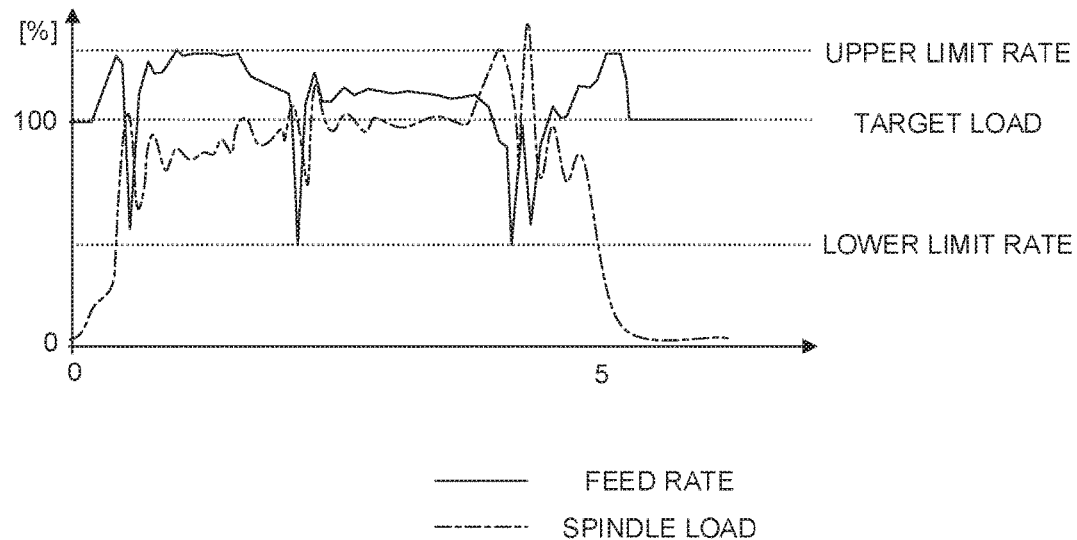
FIG. 8 is a view showing transitions of a spindle load and a feed rate during smart adaptive control according to a conventional technique.

FIG. 6 shows a system 170 according to a second embodiment, which includes the controller 1. The system 170 includes at least one controller 1 packaged as a part of a computer such as a cell computer, a host computer, or a cloud server, a plurality of machine tools 2 serving as control subjects, and a wired or wireless network 172 connecting the controller 1 and the machine tools 2 to each other.

In the system 170 configured as described above, the controller 1 having the machine learning device 100 can use the learning result acquired by the learning unit 110 to determine, automatically and accurately, the PID control parameters in relation to the machining conditions and machining environment of the machining performed by the machine tool 2 for each machine tool 2. The machine learning device 100 of the controller 1 can also be configured to learn common PID control parameters to be applied to all of the machine tools 2 on the basis of the state variables S and the determination data D acquired for each of the plurality of machine tools 2, and apply the learning result to machining by all of the machine tools 2 in common. Hence, according to the system 170, the speed and reliability with which the PID control parameters are learned can be improved by employing a more varied data set (including the state variables S and the determination data D) as input.

Embodiments of the present invention were described above, but the present invention is not limited only to the exemplary embodiments described above and may be implemented in various other embodiments by applying appropriate modifications thereto.

For example, the learning algorithm and calculation algorithm executed by the machine learning device 100 and the control algorithm and so on executed by the controller 1 are not limited to the above examples, and various other algorithms may be employed.

Further, in the above embodiments, the controller 1 and the machine learning device 100 are described as devices having different CPUs, but the machine learning device 100 may be realized by the CPU 11 of the controller 1 and the system program stored in the ROM 12.

The invention claimed is:

1. A numerical controller which, during machining performed by controlling, on the basis of a machining program, a machine having a spindle including a tool and an axis that drives the spindle, executes PID control for controlling a movement rate of the axis so that a spindle load of the spindle becomes constant, the numerical controller comprising:
   a machine learning device that learns a parameter of the PID control in relation to a machining condition and a machining environment of the machining, wherein the machine learning device includes:
      a state observation unit that observes, as state variables representing a current state of an environment, PID control parameter data indicating the parameter of the PID control during the machining, machining condition data indicating the machining condition of the machining, and machining environment data relating to the machining environment of the machining;
      a determination data acquisition unit that acquires, as determination data, tool life determination data indicating an appropriateness determination result relating to depletion of a life of the tool during the machining, and cycle time determination data indicating an appropriateness determination result relating to a cycle time of the machining; and
      a learning unit that uses the state variables and the determination data to learn the machining condition and the machining environment of the machining, and the parameter of the PID control in association with each other, and
   wherein the learning unit includes:
      a reward calculation unit that determines a reward relating to the appropriateness determination result; and
      a value function updating unit that uses the reward to update a function representing a value of the parameter of the PID control in relation to the machining condition and the machining environment of the machining, and
      the reward calculation unit issues a steadily higher award as depletion of the life of the tool decreases and the cycle time of the machining shortens.

2. The controller according to claim 1, wherein the learning unit calculates the state variables and the determination data using a multilayer structure.

3. The controller according to claim 1, wherein the machine learning device exists in a cloud server.

4. A numerical controller which, during machining performed by controlling, on the basis of a machining program, a machine having a spindle including a tool and an axis that drives the spindle, executes PID control for controlling a movement rate of the axis so that a spindle load of the spindle becomes constant, the numerical controller comprising
   a machine learning device that has learned a parameter of the PID control in relation to a machining condition and a machining environment of the machining for suppressing depletion of the life of the tool within a range where the cycle time of the machining performed does not greatly increase, wherein
   the machine learning device includes:
   a state observation unit that observes, as state variables representing a current state of an environment, PID control parameter data indicating the parameter of the PID control during the machining, machining condition data indicating the machining condition of the machining, and machining environment data relating to the machining environment of the machining;
   a learning unit that has learned the machining condition and the machining environment of the machining, and correlation of the parameter of the PID control for suppressing depletion of the life of the tool within a range where the cycle time of the machining performed does not greatly increase in association with each other; and
   an estimation result output unit that outputs the parameter of the PID control on the basis of the state variables observed by the state observation unit and a learning result generated by the learning unit,
   wherein the learning unit includes:
      a reward calculation unit that determines a reward relating to the appropriateness determination result; and
      a value function updating unit that uses the reward to update a function representing a value of the parameter of the PID control in relation to the machining condition and the machining environment of the machining, and the reward calculation unit issues a steadily higher award as depletion of the life of the tool decreases and the cycle time of the machining shortens.

5. A machine learning device which, when PID control is executed during machining performed by controlling, on the basis of a machining program, a machine having a spindle including a tool and an axis that drives the spindle, the PID control being executed to control a movement rate of the axis so that a spindle load of the spindle becomes constant, learns a parameter of the PID control in relation to a machining condition and a machining environment of the machining, the machine learning device comprising:
- a state observation unit that observes, as state variables representing a current state of an environment, PID control parameter data indicating the parameter of the PID control during the machining, machining condition data indicating the machining condition of the machining, and machining environment data relating to the machining environment of the machining;
- a determination data acquisition unit that acquires, as determination data, tool life determination data indicating an appropriateness determination result relating to depletion of a life of the tool during the machining, and cycle time determination data indicating an appropriateness determination result relating to a cycle time of the machining; and
- a learning unit that uses the state variables and the determination data to learn the machining condition and the machining environment of the machining, and the parameter of the PID control in association with each other,
- wherein the learning unit includes:
  - a reward calculation unit that determines a reward relating to the appropriateness determination result; and
  - a value function updating unit that uses the reward to update a function representing a value of the parameter of the PID control in relation to the machining condition and the machining environment of the machining, and the reward calculation unit issues a steadily higher award as depletion of the life of the tool decreases and the cycle time of the machining shortens.

6. A machine learning device which, when PID control is executed during machining performed by controlling, on the basis of a machining program, a machine having a spindle including a tool and an axis that drives the spindle, the PID control being executed to control a movement rate of the axis so that a spindle load of the spindle becomes constant, has learned a parameter of the PID control in relation to a machining condition and a machining environment of the machining for suppressing depletion of the life of the tool within a range where the cycle time of the machining performed does not greatly increase, the machine learning device comprising:
- a state observation unit that observes, as state variables representing a current state of an environment, PID control parameter data indicating the parameter of the PID control during the machining, machining condition data indicating the machining condition of the machining, and machining environment data relating to the machining environment of the machining;
- a learning unit that has learned the machining condition and the machining environment of the machining, and correlation of the parameter of the PID control for suppressing depletion of the life of the tool within a range where the cycle time of the machining performed does not greatly increase in association with each other; and
- an estimation result output unit that outputs the parameter of the PID control on the basis of the state variables observed by the state observation unit and a learning result generated by the learning unit,
- wherein the learning unit includes:
  - a reward calculation unit that determines a reward relating to the appropriateness determination result; and
  - a value function updating unit that uses the reward to update a function representing a value of the parameter of the PID control in relation to the machining condition and the machining environment of the machining, and the reward calculation unit issues a steadily higher award as depletion of the life of the tool decreases and the cycle time of the machining shortens.

* * * * *